July 23, 1974 J. R. KIES 3,825,642
METHOD FOR PRODUCING A FILM-FACED PRODUCT
Filed Nov. 3, 1971 4 Sheets-Sheet 1

INVENTOR.
JARED R. KIES
BY
*Staelin & Overman*
ATTORNEYS

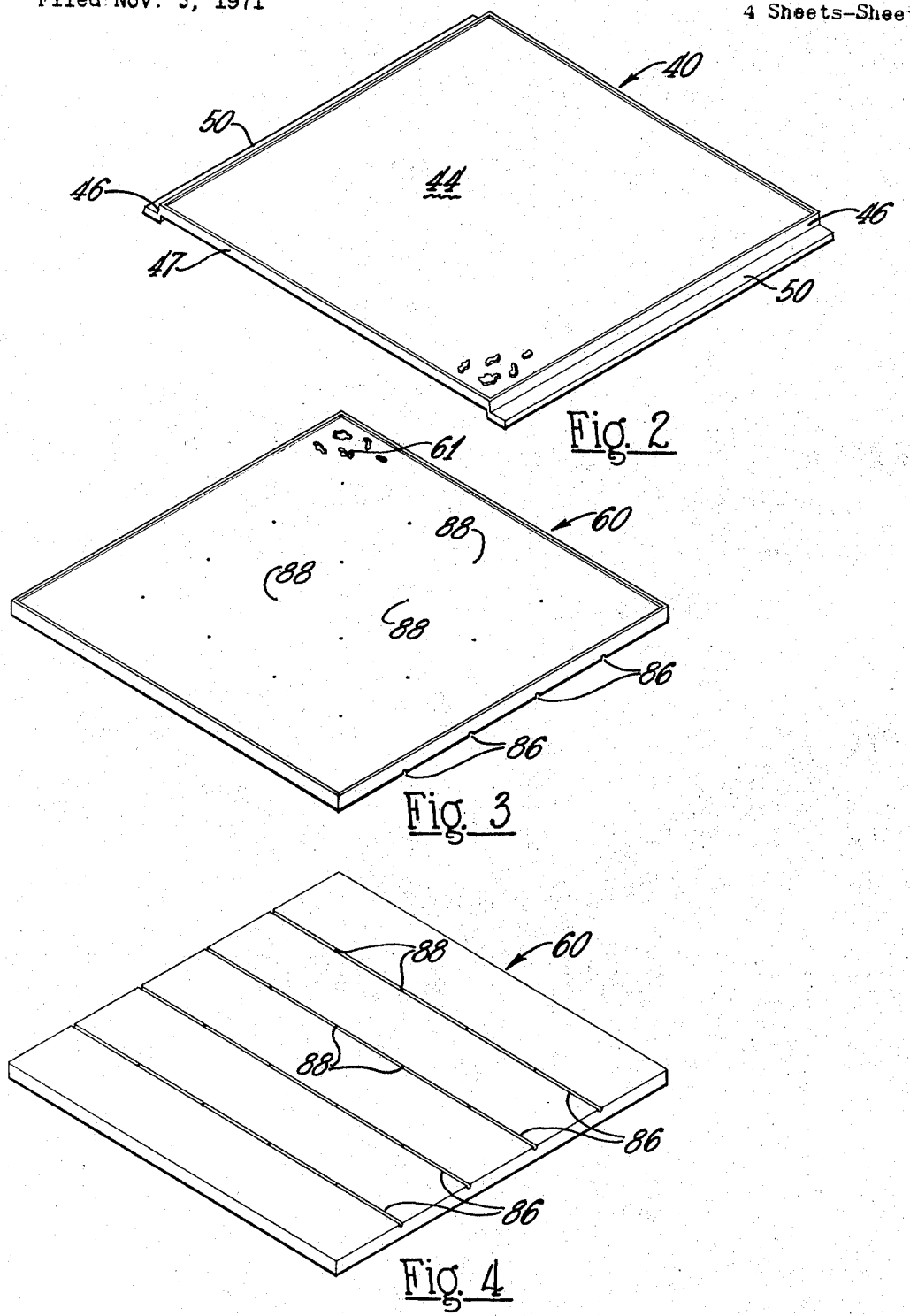

July 23, 1974  J. R. KIES  3,825,642

METHOD FOR PRODUCING A FILM-FACED PRODUCT

Filed Nov. 3, 1971  4 Sheets-Sheet 3

INVENTOR.
JARED R. KIES
BY
*Staelin & Overman*
ATTORNEYS

July 23, 1974  J. R. KIES  3,825,642

METHOD FOR PRODUCING A FILM-FACED PRODUCT

Filed Nov. 3, 1971  4 Sheets-Sheet 4

INVENTOR.
JARED R. KIES
BY
*Staelin & Overman*
ATTORNEYS

United States Patent Office 3,825,642
Patented July 23, 1974

3,825,642
METHOD FOR PRODUCING A FILM-FACED
PRODUCT
Jared R. Kies, Newark, Ohio, assignor to Owens-Corning
Fiberglas Corporation
Filed Nov. 3, 1971, Ser. No. 195,246
Int. Cl. B29c 17/04; B29j 5/04
U.S. Cl. 264—90                                    8 Claims

ABSTRACT OF THE DISCLOSURE

Method of molding a film-faced product. The method involves placing a body or mass of compressible material such as a body or mass of mineral fibers impregnated with a binder in a contoured molding matrix with a self-supporting resinous film disposed on a major surface of the body or mass, applying reduced pressure to force the film into intimate contiguous engagement with a contoured matrix, compressing the body or mass of material in the molding facility, and setting the binder in the molded product. The film facing of the product is adhered to the compressed mass or body and shaped to a high fidelity of configuration of the molding matrix.

---

The invention relates to a method of molding bodies, panels or tiles bearing a self-supporting film facing, the bodies, panels or tiles being particularly usable for surfacing ceilings and walls of rooms, the panels, tiles or bodies being of compressed, binder-impregnated mineral fibers, such as glass fibers, faced with a resinous film adhered to a body, panel or tile through the setting of the binder in the fibers.

Bodies, tiles or panels of mineral fibers have been made wherein a mass of binder-impregnated fibers is placed in a mold with a self-supporting resin film on the mass or body of fibers, the mass or body of fibers being compressed during the molding operation, the compression stresses providing the force for generally contouring the surfacing film to the pattern of a matrix.

It is found that where the matrix surface employed is replete with randomly disposed raised regions or lands and indentations for decorative purposes, the compression stresses set up during molding of the mass of fibers are not effective in contouring the self-supporting resinous film to the randomly disposed raised portions and indentations in the matrix whereby the film facing or surfacing does not accurately conform to the contour of the matrix, the compression stresses being insufficient to effect a sharp delineation of raised portions and indentations of the matrix in the film facing of the bodies, panels or tiles.

The invention embraces a method wherein a mass of moldable material such as a body or a quantity of mineral fibers, particularly glass fibers, is placed in a molding facility with a sheet or layer of flexible or moldable facing material disposed on the mass of moldable material and wherein during an operative cycle of the molding facility in compressing the body or mass to form a molded panel or tile, the sheet or layer of facing material is subjected to differential pressure to provide a high fidelity contour or pattern of the facing material with a surface of the matrix whereby the configurations of the facing or surfacing layers of successively molded panels or tiles are rendered substantially identical.

Another object of the invention resides in a method of forming bodies, panels or tiles of a mass of moldable material such as a mass or body of mineral fibers faced with a sheet or layer of yieldable material wherein during a compression operation of the mass of moldable material, the facing sheet or layer is held in high fidelity of contour with a surface of a matrix of a molding facility independently of the force compressing the mass of moldable material into a substantially rigid body, panel or tile, the facing being adhesively joined to the compressed molded material.

Another object of the invention resides in a method for molding a mass of compressible moldable material provided with a facing layer or sheet of yieldable or flexible material wherein a molding facility and a molding matrix are provided with passages connected with a source of reduced pressure or suction whereby during a molding cycle the facing layer or sheet is accurately drawn or shaped into contiguous relation with the matrix whereby a high fidelity of contour of the matrix is reproduced in the surfacing layer or sheet and the surfacing layer adhesively joined to the molded body, panel or tile.

Another object of the invention resides in an arrangement in a molding method for compressing a mass of fibers such as mineral fibers to form a molded body or panel wherein a flexible facing layer of resinous material is disposed on the uncompressed mass and reduced pressure established between the facing layer or sheet and a surface of a matrix whereby the resinous sheet or layer is drawn or adhered by the reduced pressure into intimate contiguous engagement with the matrix surface whereby the resinous layer embodies with high fidelity the contour of the matrix surface.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 2 is an isometric view of a molded body fashioned through the use of the method and apparatus of the invention;

FIG. 3 is an isometric view of a matrix for engagement with the surfacing layer during a molding operation;

FIG. 4 is an isometric view illustrating the opposite major surface of the matrix shown in FIG. 3;

Figure 1:
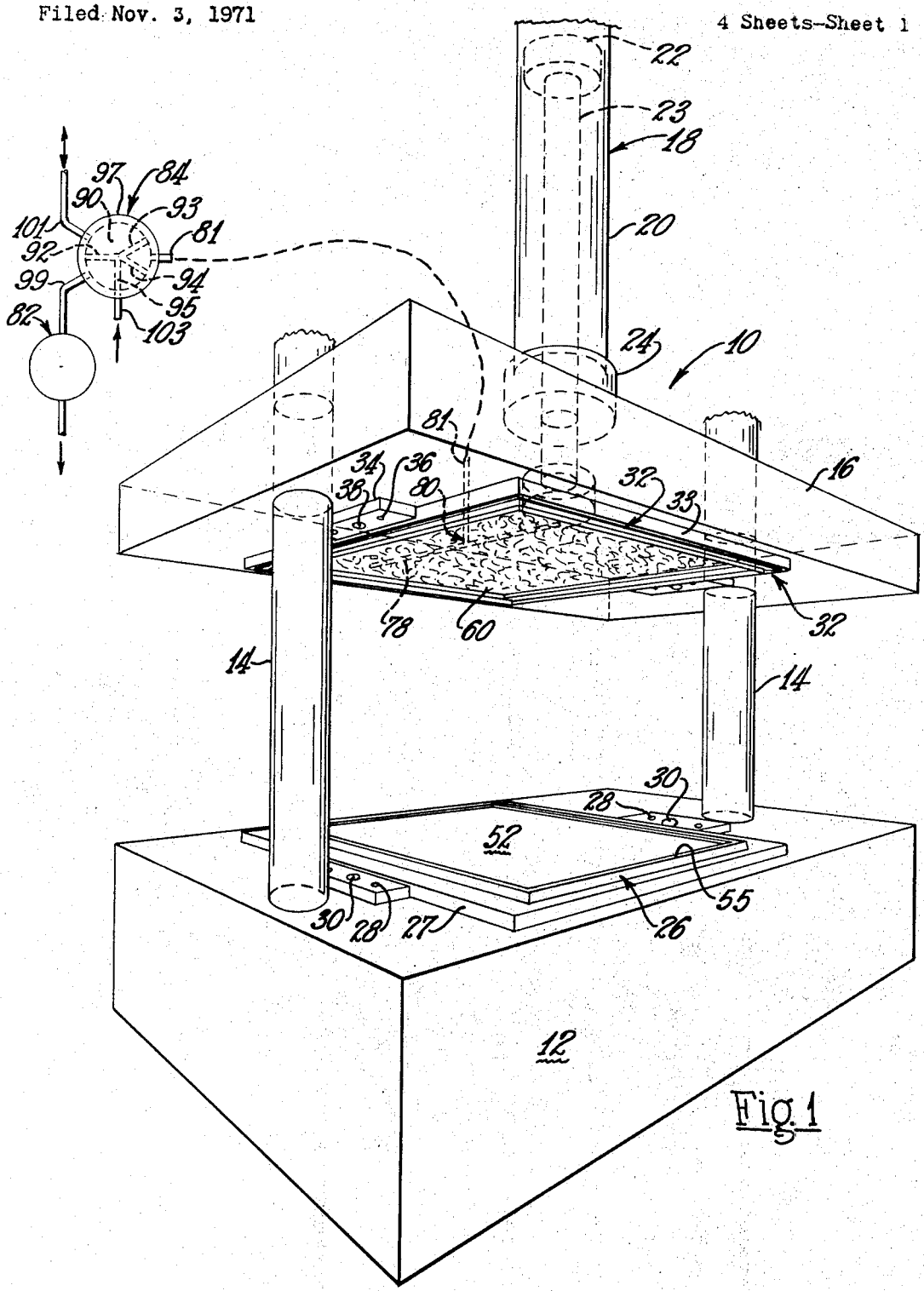
FIG. 1 is an isometric schematic view of a molding press or molding facility illustrating the matrices for compressing and molding a body of material provided with a facing layer.

The method and apparatus of the invention are especially adapted for molding bodies, panels or acoustic tiles fashioned of compressed mineral fibers, such as glass fibers, bonded by a cured binder with a surfacing or facing layer or film of yieldable material. It is to be understood that other suitable moldable materials may be employed in forming the film-faced molded bodies or units through the use of the method and apparatus of the invention.

In the illustrated embodiment of the apparatus or molding facility for molding bodies, panels or acoustic tiles of compressed mineral fibers, such as glass fibers, the arrangment is inclusive of a molding press or facility 10. The molding press 10 includes a base structure 12 provided with upwardly extending members, columns or struts 14. Slidably disposed on the members 14 for relative movement with respect to the base 12 is a ram or head 16, the head being guided by the members 14.

In the embodiment illustrated, means provided for moving or sliding the head 16 is inclusive of a fluid actuator 18 which comprises a stationary cylinder 20 supported by a suitable frame means (not shown). Reciprocable in the cylinder 20 is a piston 22 mounted upon a piston rod 23, the piston rod extending through an opening in an end head 24 at the lower end of the cylinder, a conventional stuffing gland (not shown) being provided in the head 24 to effect a seal with the reciprocable piston rod.

The lower end of the rod is connected by suitable attachment means to the head 16 whereby fluid pressures established in the cylinder 20 alternately at opposite sides of the piston through conventional valve means (not shown) reciprocate the head 16 toward and away from the base 12.

Figure 6:
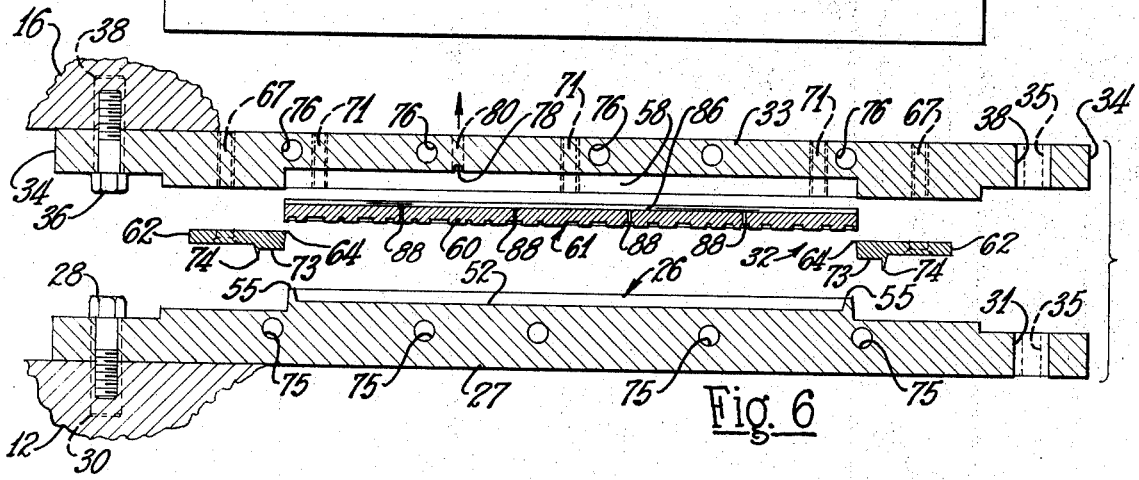
FIG. 6 is a sectional view taken substantially on the line 6—6 of FIG. 5.

Disposed upon and supported by the base 12 is a lower matrix or molding die 26, the matrix 26 being illustrated as formed on a backing plate 27 secured to the base 12 by means of bolts 28, one being shown in FIG. 6. The plate 27 equipped with the matrix 26 is accurately positioned with respect to the base 12 by dowels 30 inserted in openings 31 in the plate 27.

The upper molding die or matrix construction 32 is carried by a backing plate 33. The plate 33 is provided with projections 34 having openings 35 accommodating screws 36 securing the plate 33 to the head 16. The upper matrix construction is accurately positioned with respect to the head 16 by dowels extending into openings 38. In the molding press construction illustrated in FIG. 1, the head 16 carrying the matrix construction 32 is movable relative to the lower matrix 26, but it is to be understood that the upper matrix may be stationary and the lower matrix 26 movable relative thereto for molding a film-faced product.

The matrices illustrated are adapted to mold a body, a panel or tile 40 illustrated in FIG. 2. The body or tile 40 is molded of a mass of fibers 41, such as mineral fibers or glass fibers, the body having its obverse surface covered or face with a resinous film 42 shown in FIGS. 10 and 11. The molded body or tile 40 comprises a body of compressed material, such as glass fibers, containing a cured binder, the tile or body 40 comprising a rectangular generally planar portion 44 bounded by a skirt-like configuration comprising one opposed pair of flared or angular portions or surfaces 47, shown in FIGS. 2 and 11.

Figure 11:
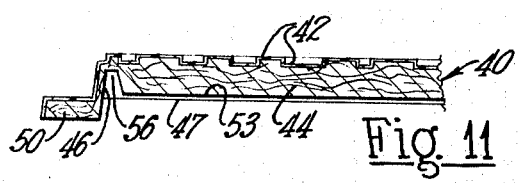
FIG. 11 is a sectional view illustrating a body, tile or panel formed according to the invention, the figure illustrating the high fidelity contour of the surfacing layer.

The pairs of angular skirts or surfaces 46 and 47 are integrally joined in the molding operation with the central section 44. The angular skirt portions 46 are provided with projections, extensions or tabs 50 integral with the angular skirt portions. In the embodiment illustrated, the central section 44 is preferably of square configuration and of standard tile dimensions such as twelve inches square or sixteen inches square. As illustrated in FIG. 11, the central generally planar section 44 is preferably of greater thickness and less density than the thickness and density of the tabs or projections 50.

In assembling, the bodies, panels or tiles 40 on a wall, ceiling or other support, the tabs 50 are of a thickness to be received beneath the angular skirt regions or portions 47. The tabs or projections 50 provide means to accommodate staples, nails or an adhesive for securing the bodies or tiles to a support. A molded tile of the character above-described is disclosed in U.S. Pat. 3,492,771.

The matrix 26 is provided with a central planar surface 52 for forming the lower surface 53 of the body or tile, shown in FIG. 11. The matrix 26 is fashioned with a rectangularly-shaped upwardly extending ridge or projection 55 which, in the molding operation, forms the rectangular recess 56, shown in FIG. 11, which bounds or defines the central section 44 of the body or tile 40.

The upper backing plate 33 is fashioned with a recess 58 which receives and accommodates the main upper die or matrix 60 of the upper matrix construction 32. The upper matrix construction 32 is inclusive of a pair of supplemental matrix members 62 having projections 64 which, in assembly with the matrix 60, engage opposed edge regions of the matrix 60 to secure the matrix in the recess 58 in the backing plate 33. The supplemental matrix members 62 are secured to the backing plate 33 by screws 66 threaded into openings 67, shown in FIG. 6.

Figure 5:
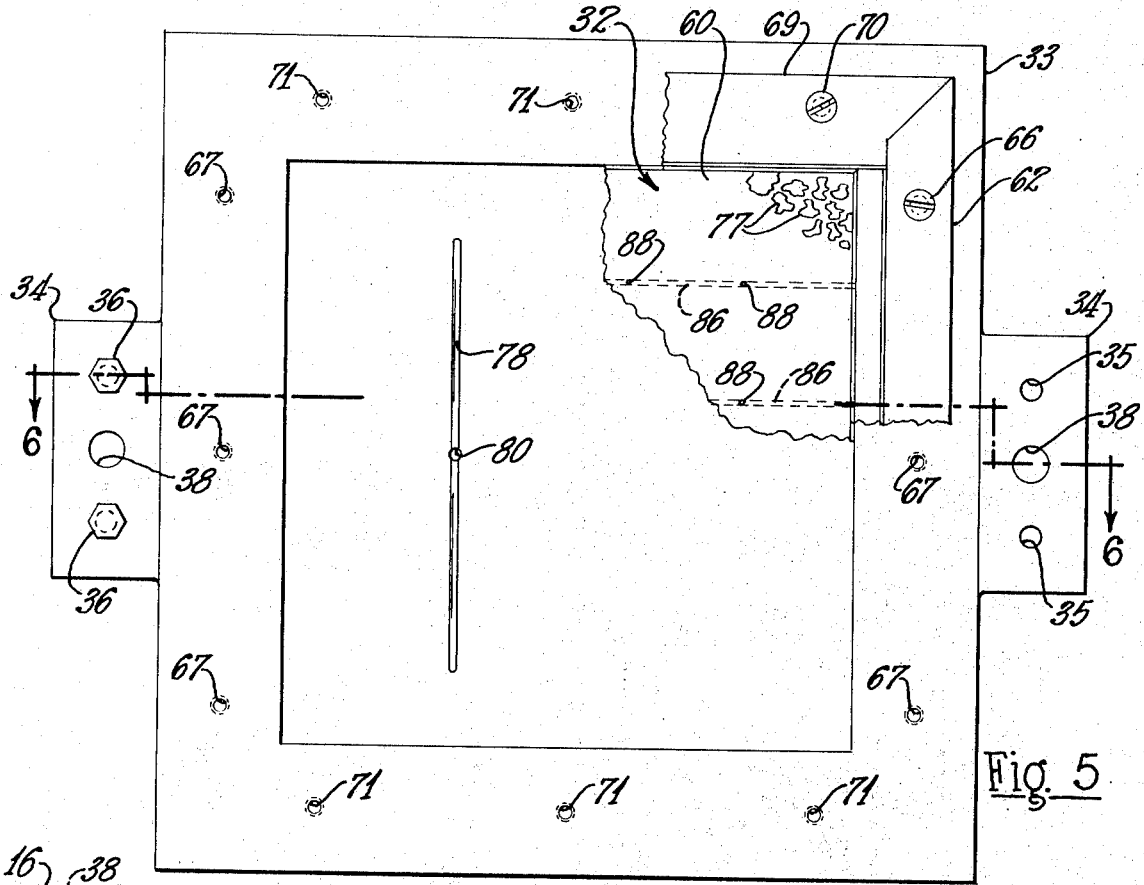
FIG. 5 is a transverse view through the press, portions being broken away illustrating passages in the upper matrix of the molding facility for the establishment of reduced pressure at the surface of the matrix.

A second pair of opposed supplemental matrix members 69, one of which is shown in FIG. 5, is provided with projections similar to the projections 64, the members 69 being secured to the backing plate 33 by screws 70 threaded into openings 71 in the backing plate. The supplemental matrix members 62 are fashioned with portions 73 which, in the molding operation, form the tabs or extensions 50.

Figure 10:
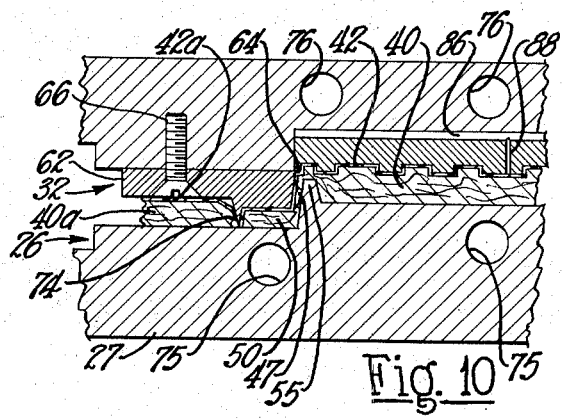
FIG. 10 is a view of the matrices in fully closed position, the moldable material being fashioned into a compressed body.

Depending projections 74 on the portions 73 define the edges of the tabs 50, the projections 74 also serving to sever the resinous film 42 and the compressed fibers, as shown in FIG. 10. The pair of members 69 is configurated to form with the ridge 55 the molded skirt portions 47 of the body or tile 40, shown in FIG. 2.

As shown in FIGS. 7 through 10, the backing plate 27 is provided with passageways or channels 75, and the backing plate 33 provided with passageways or channels 76 through which flows a heated fluid at a temperature effective to set or cure the binder in the molded body when the molding dies or matrices are in the position shown in FIG. 10 in which position the molding of a body 40 is completed. It is preferable to flow heated oil through the passages or channels 75 and 76 but other heated fluids may be used or other heating means applied to effect a setting or curing of the binder in the molded body, panel or tile 40.

The invention is inclusive of a method and arrangement for temporarily adhering the facing film or sheet 42 of resinous or plastic material in intimate engagement with the obverse face 61 of the matrix 60 in a manner to assure high fidelity of the pattern of the matrix surface 61 in the surfacing film 42. The film material 42 is held to the matrix surface independently of the compression stresses established in compressing the mass or body of fibers 41 in forming a molded body or tile 40.

The arrangement is inclusive of means for establishing reduced pressure or suction effective at the interfacial region of the film or sheet 42 of resinous material and the obverse surface area 61 of the matrix 60 to temporarily adhere the sheet or film 42 to the surface 61 prior to the completion of a molding operation. The obverse surface 61 of the matrix may be of roughened or irregular contour or pattern comprising lands or slightly raised portions 77 in repetitive or preferably random orientation on the matrix surface 61.

With reference particularly to FIGS. 1, 5 and 6, the backing plate 33 at the surface of the recess 58 is fashioned with an elongated channel or passage 78 which is in registration or communication with a passage 80 in the backing plate 33 which is adapted to be connected by a tube 81 with a source of reduced pressure or suction such as a suction blower or pump indicated schematically at 82 through a multiway or three-way valve construction indicated at 84 in FIG. 1.

The main matrix member 60 is fashioned with channels or passage means for rendering the reduced pressure or suction effective throughout the area of the obverse surface 61 of the member 60. As shown in FIGS. 3 through 6, the reverse or rear surface of the matrix 60 is provided with a plurality of elongated channels or passages 86 which, as illustrated, are in parallel relation and when the matrix 60 is assembled into the recess 58, the channels 86 are in registration or communication with the elongated channel 78 which is disposed normal to the passages 86.

The matrix member 60 is provided with a comparatively large number of spaced small orifices, passages or channels 88 extending through the matrix, the channels 88 being in communication with the channels 86 as shown in broken lines in FIG. 5. Thus, when the matrix 60 is assembled into the recess 58, reduced pressure set up in the passage 80 is communicated to the obverse surface area 61 of the matrix through the channel 78, channels 86 and the openings or passages 88.

The suction blower or suction pump 82 is adapted to be operated during molding operations. The multiway or three-way valve 84, which is of conventional construction, is inclusive of a movable valve member 90, the movement of which is adapted to be actuated by electromagnetic means (not shown) or other conventional means controlled by the relative position of the head 16 equipped with the movable matrix 60. The movable valve member 90 of the valve construction 84 in the embodiment illustrated is rotatable in a housing 97 and is fashioned with communicating passageways 92, 93, 94 and 95.

A tube 99 extends through an opening in the housing 97 and is connected with the suction blower or suction pump 82. A vent tube 101 open to the atmosphere extends through an opening in the housing. A tube 103 may be connected with the housing for conveying a fluid, such as air, under pressure to the region of the movable valve member 90.

Figure 7:
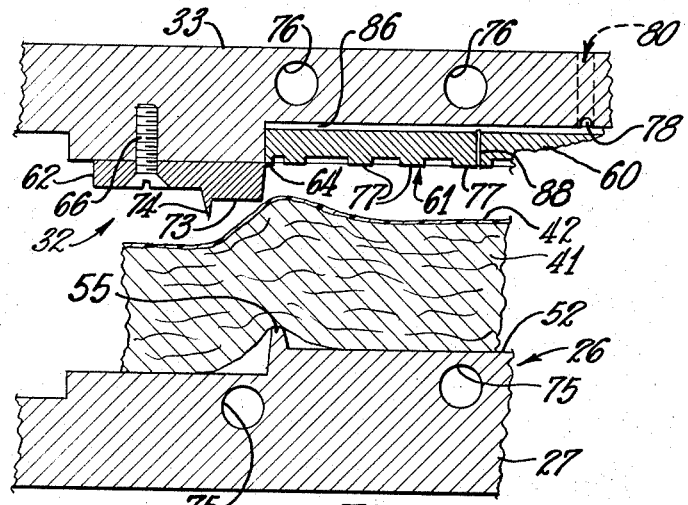
FIG. 7 is an enlarged detail sectional view illustrating the initial position of a mass of moldable material and a facing or surfacing layer therefor between the matrices prior to a molding cycle.

FIGS. 7 through 10 illustrate four relative positions of the matrix construction 32, which comprise the matrix members 61, 62 and 69, with respect to the matrix 26 at four stages in a molding operation. FIG. 7 illustrates the matrices in full open spaced relation, a mass of moldable material 41, such as mineral or glass fibers impregnated with a binder, such as phenolformaldehyde, disposed on the lower matrix 26 with the facing layer, film or sheet 42 of yieldable or flexible material, for example, resinous or plastic material, such as a vinyl film (copolymer of vinyl chloride and vinyl acetate) or other self-supporting plastic film.

Figure 8:
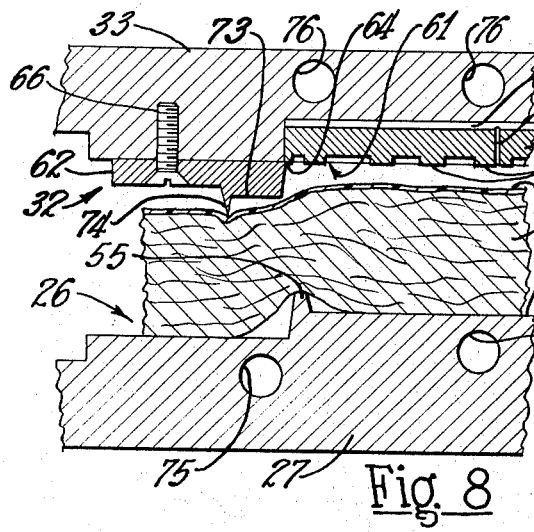
FIG. 8 is a sectional view similar to FIG. 7 illustrating the matrix in one position of relative movement during a molding cycle.
Figure 9:
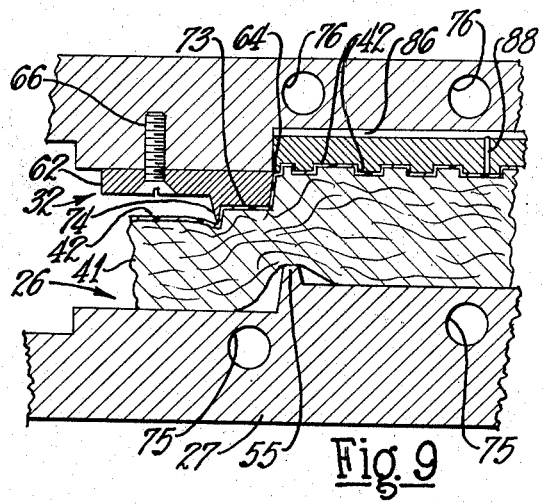
FIG. 9 is a view similar to FIG. 8 showing another position of the movable matrix during a molding cycle.

FIG. 8 illustrates the matrix construction components 60, 62 and the backing plate 33 moved toward and relative to the matrix 26 wherein the projections 74 on the matrix members 62 and similar projections on the matrix members 69 engage the resinous film 42. At this stage in the molding operation reduced pressure or suction is established in the region between the matrix 60 and the resin film which is effective to force the resin film 42 into intimate contact with the surface 61 of the matrix 60 whereby the film 42, independently of the stresses of compression of the partially compressed mass 41, accurately conforms to the raised portions and recesses which may be provided in the obverse surface of the matrix 60. This position of the resinous film 42 and the mass 41 of fibers under partial compression is illustrated in FIG. 9, the matrix 60 having been moved closer to the matrix 26 from its position illustrated in FIG. 8.

FIG. 10 illustrates the matrices in fully closed position forming a complete molded body, panel or tile 40, the depending projections 74 and similar projections on the matrix members 69 severing the resinous film and the compressed fibers at the boundary regions of the formed product 40, thus separating the molded body from the waste fibrous material 40a and waste resin film 42a.

The matrices or dies 26 and 60 and the components 62 and 69 associated with the matrix 60 are held in closed position illustrated in FIG. 10 until the heat provided by the heated fluid flowing through the passages 75 and 76 has effected a complete setting or curing of the binder in the molded body 40. After the binder has been fully set or cured, the head 16 and matrix construction 32 are moved upwardly by the actuator 18 and the finished or molded body 40 removed from the molding press 10.

The operation of the valve means or member 90 of the valve construction 84 during a molding operation is as follows: When the matrices 26 and 60 are in an open position accommodating a mass or batt of binder-impregnated fibers 41 or other compressible material having a resinous sheet or layer 42 disposed thereon as illustrated in FIG. 7, the movable valve member 90 is preferably in a position wherein the tube 81 is in registration with the vent passage or tube 101 through passage 93 which is in registration with the tube 81 and passage 92 which is in registration with the vent tube 101, or the member may be in the position shown in FIG. 1 with the passages in member 90 out of registration with the tube 81.

When the matrix 60 is moved by the head 16 toward the matrix 26 to substantially the position shown in FIG. 8, the movable valve member 90 is moved to a position bringing the passage 94 in registration with the tube 81 and the passage 92 into registration with the tube 99, passages 92 and 94 being in communication as shown in FIG. 1. In this position of valve member 90, the reduced pressure or suction developed by the suction blower or suction pump 82 is effective through tube 99, passages 92, 94, tube 81, passages 80 and 78 and the channels 86 in the matrix 60 to establish reduced or subatmospheric pressure in the space between the resinous film 42 and the obverse face or surface 61 of the matrix 60.

In this position of the backing plate 33 and the matrix construction 32, the depending projections 64, and similar projections on the members 69, are engaged with the resinous film 42. As the depending projections are in sealing engagement or contact with the resinous film 42, a closed rectangular region is formed, and the reduced pressure established by the suction blower or pump 82 in the space or region between the resinous film 42 and the surface 61 of the matrix member 60 is effective to force and flex the resinous film 42 into intimate engagement with the lands and recesses provided on the matrix surface 61 whereby the resinous film is configurated accurately with high fidelity to the pattern on the surface 61 of the matrix 60, as shown in FIG. 9.

This movement of the resinous film 42 into intimate engagement with the matrix surface 61 occurs under the influence of reduced pressure developed by the suction blower or pump 82 and substantially independently of the compression stresses set up in the mass 41 of fibers. The intimate engagement of the resin film 42 with the matrix surface 61 is illustrated in FIG. 9.

The upper matrix construction 32, upon further downward movement, fully compresses the mass 41 of fibers to form the molded body, panel or title 40 shown in FIG. 10. During the period that the matrices or dies are in closed or mold-forming position, shown in FIG. 10, heated fluid, such as heated oil, is circulated through the passages 75 and 76 to set or cure the binder in the molded product. The valve means or member 90 is moved to a position wherein the tube 81 is in communication with the vent tube 101 through passages 93 and 92 so that normal or atmospheric pressure is restored in the passages 88 and hence at the interfacial region of the resinous facing or film 42 with the matrix surface 61. The curing of the binder in the mass of fibers or moldable material 41 effects a bonding or joining of the resin film 42 to the molded body 40.

In event that there is a tendency for the resinous film 42 to adhere to the matrix surface 61 in effecting removal of the molded body 40 from the molding facility, air pressure may be established at the interfacial region of the resinous film 42 with the matrix surface 61 to assist in the removal of the molded product. A tube 103 extending into an opening in the valve housing may be connected with a supply of air under pressure or compressed air. During a molding operation, the passage 95 in the valve member 90 is out of registration with the tube 81 and the vent tube 101.

When air pressure is desired to be established in the tube 81 to assist in the removal of a molded body 40, the valve member 90 is moved to a position wherein the passage 95 is in registration with the tube 81, in which position the passage 92 is in registration with the tube 103 and passage 95 in registration with the tube 81 whereby compressed air is conveyed through the tube 103, connecting passageways 92 and 95, tube 81, passages 80 and 78 and passages 88 in the matrix 60 to assist in releasing the film or layer 42 from its intimate engagement with the surface 61 of the matrix 60. In molding operations where there is no appreciable tendency for the film 42 to adhere to the matrix, the use of compressed air may be unnecessary.

It is apparent that, within the scope of the invention, modifications and different arrangements may be made other than as herein disclosed, and the present disclosure is illustrative merely, the invention comprehending all variations thereof.

I claim:

1. The method of processing a body of compressible porous material impregnated with a binder including positioning a layer of moldable facing material on a major surface of the body, disposing the body and layer of facing material between molding dies wherein one of the dies has an obverse roughened surface replete with randomly disposed raised lands and indentations, establishing reduced pressure in a region between the layer of material and the adjacent die having the roughened surface, forcing and flexing the layer of material under the influence of the reduced pressure into intimate contact with the roughened surface region of the adjacent die, effecting relative movement of the molding dies compressing the body, setting the binder in the compressed body, and adhering the layer of facing material by the binder to the compressed body.

2. A method of processing a body of compressible porous material impregnated with a binder including positioning a layer of moldable material on a major surface of the porous body, disposing the porous body and layer of moldable material adjacent a molding matrix having an obverse roughened surface replete with randomly disposed raised lands and indentations, establishing reduced pressure in the space between the layer of moldable material and the roughened surface of the matrix, forcing and flexing the layer of moldable material under the influence of the reduced pressure into intimate high fidelity contact with the roughened surface of the matrix, effecting relative movement of the molding matrix compressing the porous body to a comparatively high density body, setting the binder in the high density body rendering the body substantially rigid, and adhering the layer of moldable material by the binder to the rigid body.

3. The method of forming a film-faced body of mineral fibers impregnated with a binder including the steps of positioning a self-supporting moldable film on a major surface of a mass of mineral fibers, disposing the mass of fibers and film between molding dies with the film adjacent a molding matrix having an obverse roughened surface replete with randomly disposed raised lands and indentations, establishing communication of the region between the film and the adjacent die with a source of reduced pressure whereby to establish reduced pressure between the film and the adjacent die, forcing and flexing the film under the influence of the reduced pressure into intimate contact with the surface region of the adjacent die, effecting relative movement of the dies compressing the mass of fibers to a comparatively high density body, heat-curing the binder in the high density body rendering the body substantially rigid, and joining the film to the body by the binder.

4. A method of processing a compressible porous body impregnated with a binder including the steps of positioning a layer of flexible moldable facing material on a major surface of the compressible porous body, disposing the body and layer of facing material between molding matrices wherein an obverse surface of the matrix adjacent the facing material is a roughened surface replete with randomly disposed raised lands and indentations, effecting initial movement of one matrix toward the other partially compressing the porous body, establishing reduced pressure in the region between the layer of facing material and the roughened obverse surface of the matrix, forcing and flexing the layer of facing material under the influence of reduced pressure into intimate high fidelity contact with the roughened obverse surface of the matrix, further moving one matrix toward the other compressing the porous body to a comparatively thin substantially rigid body of relatively high density, setting the binder in the compressed body, adhering the layer of facing material by the binder to the compressed body, and restoring normal pressure at the interface of the layer of facing material with the obverse surface of the adjacent matrix.

5. The method according to claim 4 including the step of establishing pressure at the interface of the layer of facing material on the compressed body with the obverse roughened surface of the adjacent matrix to promote separation of the layer of facing material from the roughened surface of the matrix.

6. The method of processing a compressible mass of fibers impregnated with a binder including the steps of positioning a self-supporting moldable film on a major surface of the mass of fibers, disposing the mass of fibers and moldable film between molding matrices with the film adjacent a molding matrix having an obverse roughened surface replete with randomly disposed raised lands and indentations, exhausting air from the region between the moldable film and the adjacent matrix forcing and flexing the film into intimate contact with the surface region of the adjacent matrix, effecting relative movement of the matrices compressing the mass of fibers to a substantially rigid body, setting the binder in the body of compressed fibers, and adhering the film by the binder to the substantially rigid body.

7. The method of forming a film-faced body of fibers impregnated with a binder including the steps of positioning a self-supporting resinous film on a major surface of a mass of fibers, disposing the mass of fibers and the film between relatively movable molding matrices of a molding press with the film adjacent a molding matrix having an obverse roughened surface replete with randomly disposed raised lands and indentations, effecting initial relative movement of one matrix toward the other to establish a seal between the film and the adjacent matrix, establishing reduced pressure in the sealed region between the film and the obverse surface of the adjacent matrix to force and flex the film into intimate high fidelity contact with the obverse surface of the matrix, effecting further relative movement of one matrix toward the other to compress the mass of fibers to a substantially rigid body, setting the binder in the body of compressed fibers, adhering the resinous film to the substantially rigid body by the binder, and normalizing the pressure at the interface of the film with the obverse surface of the adjacent matrix.

8. The method of forming a film-faced body of glass fibers impregnated with a heat-curable binder including the steps of positioning a self-supporting resinous film on a major surface of a mass of glass fibers, disposing the mass of fibers and the film between relatively movable molding matrices mounted by backing plates of a molding press with the film adjacent a molding matrix having obverse roughened surface replete with randomly disposed raised lands and indentations, effecting initial relative movement of one matrix toward the other to establish a seal between the film and the adjacent matrix, establishing reduced pressure in the sealed region between the film and the obverse surface of the adjacent matrix to force and flex the film into intimate contact with the obverse surface of the martix, effecting further relative movement of one matrix toward the other to compress the mass of glass fibers to a substantially rigid body, circulating heated fluid through passages in the backing plates for heat-curing the binder in the body of compressed fibers, adhering the resinous film to the substantially rigid body by the binder, and normalizing the pressure at the interface of the film with the obverse surface of the matrix.

References Cited

UNITED STATES PATENTS

| 3,423,267 | 1/1969 | Munk | 264—112 X |
| 3,373,233 | 3/1968 | Rondum | 264—112 X |
| 3,627,864 | 12/1971 | Doubleday | 264—112 |
| 3,054,714 | 9/1962 | Johnston | 264—112 X |

JAN H. SILBAUGH, Primary Examiner

U.S. Cl. X.R.

156— 212, 285; 264—112, 119, 120, 255, 266